Patented Jan. 15, 1946

2,393,129

UNITED STATES PATENT OFFICE 2,393,129

SUBSTITUTED ETHYLENE OXIDE COMPOUNDS AND PROCESS FOR PREPARING THE SAME

Frank H. Tendick, Grosse Pointe Park, Mich., assignor to Parke, Davis & Company, Detroit, Mich., a corporation of Michigan No Drawing. Original application June 27, 1939, Serial No. 281,461. Divided and this application February 7, 1944, Serial No. 521,436

12 Claims. (Cl. 260—348)

The invention relates to the manufacture of hydroxy aryl-substituted unsaturated hydrocarbons, and more particularly to the manufacture of di-hydroxyaryl di-alkyl substituted ethylenic compounds and new intermediate compounds useful for obtaining the same.

This application is a division of my copending application, Serial No. 281,461, filed June 27, 1939, now United States Patent No. 2,349,770, issued May 23, 1944.

The starting materials of the present invention are di-hydroxyaryl di-alkyl substituted ethylene glycols. Such compounds are of the pinacol type. A surprising feature of the invention is that treatment of the phenolic-substituted glycols with acid does not cause the well-known pinacol rearrangement. Instead of forming a pinacoline by rearrangement of the pinacol and elimination of water, the glycols used in the present invention are converted by acids into oxides.

The transformations occur in a manner which can be represented diagrammatically as follows:

R in the above formulas represents a saturated or unsaturated lower aliphatic hydrocarbon radical, while R' represents a member of the group hydrogen and aromatic and aliphatic carboxylic acid acyl groups. Ar stands for an aryl residue, such as a benzene, toluene, naphthalene, anthracene, phenanthrene, or like residue in which the group R'—O— is attached to a carbon atom in the same 6-carbon ring of Ar as that by which Ar is attached to the ethylenic carbon atom. The groups R, R'—O— and Ar can, in each case, be the same or different groups.

The step of treating the phenolic substituted glycol with acid to convert it into a substituted ethylene oxide type of compound, can be carried out by the use of a mineral acid, such as hydrochloric, hydrobromic, sulfuric, phosphoric or similar acid, either in aqueous or in anhydrous solution. For instance, one can use an aqueous solution of hydrochloric acid, or hydrogen chloride in glacial acetic acid can be used.

When the phenolic groups of the original substituted glycol compound are replaced by carboxylic acid ester groups, they remain unchanged by the acid treatment and are present in the oxide. The ester groups of the oxide are difficult to hydrolyze off and replace by phenolic hydroxyl. However, such replacement will occur if the oxide esters are treated in a strongly alkaline medium, such as an alcoholic solution of an alkali metal alcoholate.

The invention can be illustrated by the following examples:

*Example 1.—Preparation of diethyl-di-p-hydroxyphenyl ethylene glycol*

Twenty-five grams of para-hydroxy-propiophenone are dissolved in 600 cc. of methanol. Twenty-five grams of clean aluminum turnings are treated with mercuric chloride to amalgamate the same and are then added to the ketone solution. The mixture is stirred for six to eight hours while keeping the mixture warm on a steam bath. At the end of this time, the suspension is decanted from undissolved metal and the latter washed with hot methanol. The washings are added to the decanted suspension and most of the alcohol distilled off. The residue from this distillation is mainly $\alpha,\beta$-diethyl-$\alpha,\beta$-di-p-hydroxyphenyl ethylene glycol. The crystalline glycol can be obtained, in highly purified form, if desired, by taking it up in organic solvents, concentrating the solution and cooling. It may be characterized by its dibenzoate which melts at about 220° C.

The transformations occurring in this example may be indicated as follows:

Para-hydroxy-propiophenone $\alpha,\beta$-Diethyl-$\alpha,\beta$-di-p-hydroxyphenyl ethylene glycol Dibenzoate, M. P. 220° C.

In this example, instead of reducing p-hydroxy propiophenone, any other hydroxyaryl alkyl ketone can be used. For example, one can use ortho- and meta-hydroxy propiophenone, hydroxy butyrophenone, hydroxy caprylophenone, ortho-methyl p-hydroxy propiophenone, etc. Furthermore, by reducing a mixture of hydroxyaryl alkyl ketones it is possible to obtain unsymmetrical glycols in which the aryl residues are different, or in which the alkyl substituents differ from one another. One can also obtain unsymmetrical glycols in which the aryl residues and also the alkyl substitutents differ from one another. However, reduction of a single ketone, rather than a mixture of ketones, gives only a single symmetrical glycol. This is the simplest variation of the process and is preferred, because separation of the product is easier.

*Example 2.—Preparation of diethyl-di-p-hydroxyphenyl ethylene oxide*

The α,β-diethyl-α,β-di-p-hydroxyphenyl ethylene glycole product of Example 1 is acidified with hydrochloric acid, water added, and the mixture boiled until no more alcohol distils off. The residue is extracted with ether and the ether extract washed with dilute hydrochloric acid and then with water. The ether is evaporated off to give α,β-diethyl-α,β-di-p-hydroxyphenyl ethylene oxide. It may be obtained either as an oil or, by treatment with solvents and cooling, as crystals.

The transformation of this example may be illustrated as follows:

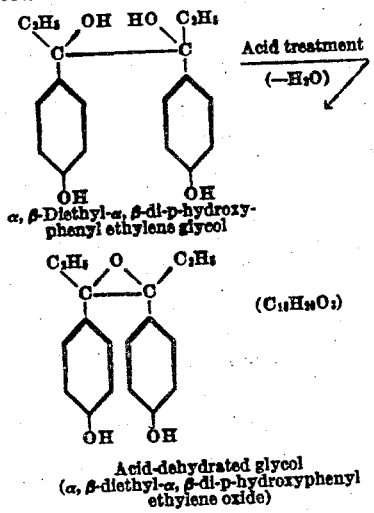

*Example 3.—Preparation of dibenzoate of diethyl-di-p-hydroxyphenyl ethylene oxide*

The oily α,β-diethyl-α,β-di-p-hydroxyphenyl ethylene oxide is taken up in one liter of 2½% sodium hydroxide solution and shaken with 25 cc. of benzoyl chloride which is added in 5 cc. portions. A crude benzoate forms and is filtered off and the filtrate shaken with 10 cc. more of benzoyl chloride to obtain an additional small quantity of insoluble benzoate. The benzoate is washed with water, triturated with a small amount of ethyl ether, and finally filtered and washed with ether. Any of the benzoate in the ether washings can be recovered by washing out with dilute alkali solution and water and evaporating off the ether. The benzoate can be dissolved in chloroform, filtered, and the filtrate evaporated to a thick solution. Hot alcohol is added to the solution and boiling continued until a large amount of crystalline benzoate separates out. The solution is chilled and then filtered to give crystals of the dibenzoate of α,β-diethyl-α,β-di-p-hydroxyphenyl ethylene oxide, melting at 176–177° C.

The examples are given merely for purposes of illustrating the invention and not to limit it to the materials and conditions given therein. Other equivalent conditions and compounds may be used, as have already been mentioned above.

What I claim as my invention is:

1. Process for the preparation of a compound having the formula

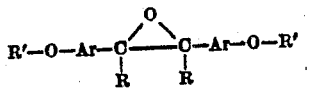

which comprises treating with strong mineral acid a compound having the formula

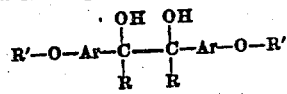

where R is a lower aliphatic hydrocarbon radical, R' represents a member of the class consisting of hydrogen and organic carboxylic acid acyl groups, Ar is an aryl residue in which the group R'—O— is attached to a carbon atom in the same 6-carbon ring of Ar as that by which Ar is attached to the ethylenic carbon atom.

2. The process for the preparation of an α,β-dialkyl-α,β-dihydroxyphenyl ethylene oxide which comprises treating an α,β-dialkyl-α,β-dihydroxyphenyl ethylene glycol with strong mineral acid.

3. Process for the preparation of α,β-diethyl-α,β-di-p-hydroxyphenyl ethylene oxide which comprises treating α,β-diethyl-α,β-di-p-hydroxyphenyl ethylene glycol with strong mineral acid.

4. Process for the preparation of a carboxylic acid ester of a α,β-dialkyl-α,β-dihydroxy aryl ethylene oxide which comprises treating an α,β-dialkyl-α,β-dihydroxy aryl ethylene glycol with a strong mineral acid thereby forming an α,β-dialkyl-α,β-dihydroxy aryl ethylene oxide and treating said oxide with a carboxylic acid acylating agent.

5. Process for the preparation of a carboxylic acid ester of diethyl-di-p-hydroxyphenol ethylene oxide which comprises treating diethyl-di-p-hydroxyphenyl ethylene glycol with a strong mineral acid thereby forming diethyl-di-p-hydroxyphenyl ethylene oxide and treating said oxide with a carboxylic acid acylating agent.

6. Process for the preparation of the dibenzoate of diethyl-di-p-hydroxyphenyl ethylene oxide which comprises treating di-ethyl-di-p-hydroxyphenyl ethylene glycol with a strong mineral acid thereby forming diethyl-di-p-hydroxyphenyl ethylene oxide and treating said oxide with benzoyl chloride.

7. A compound having the formula

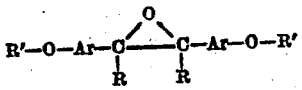

where R is a lower aliphatic hydrocarbon radical, R' represents a member of the class consisting of hydrogen and organic carboxylic acid acyl groups, Ar is an aryl residue in which the group R'—O— is attached to a carbon atom in the same 6-carbon ring of Ar as that by which Ar is attached to the ethylenic carbon atom.

8. An α,β-dialkyl-α,β-dihydroxy aryl ethylene oxide.

9. An organic carboxylic acid di-ester of an

α,β-dialkyl-α,β-dihydroxy aryl ethylene oxide.
10. A compound having the formula
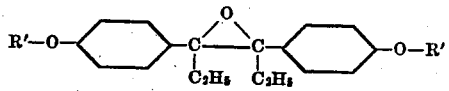
where R' represents a member of the class consisting of hydrogen and organic carboxylic acid acyl groups.
11. α,β-diethyl-α,β-di-para-hydroxyphenyl ethylene oxide.
12. The dibenzoate of α,β-diethyl-α,β-di-para-hydroxyphenyl ethylene oxide.
FRANK H. TENDICK.